US008976550B2

United States Patent
Hsiao et al.

(10) Patent No.: US 8,976,550 B2
(45) Date of Patent: Mar. 10, 2015

(54) POWER SUPPLY HAVING A SURGE PROTECTION CIRCUIT

(75) Inventors: Chih-Wei Hsiao, Taipei (TW); Yuan-Liang Hsu, Taipei (TW)

(73) Assignee: Cyber Power Systems Inc., Nangang District, Taipei (TW)

( * ) Notice: Subject to any disclaimer, the term of this patent is extended or adjusted under 35 U.S.C. 154(b) by 131 days.

(21) Appl. No.: 13/199,069

(22) Filed: Aug. 18, 2011

(65) Prior Publication Data

US 2013/0044523 A1 Feb. 21, 2013

(51) Int. Cl.
*H02H 7/125* (2006.01)
*H02H 9/04* (2006.01)

(52) U.S. Cl.
CPC *H02H 7/125* (2013.01); *H02H 9/04* (2013.01)
USPC ............................................ 363/52; 361/118

(58) Field of Classification Search
CPC ....................................................... H02H 7/125
USPC ................. 363/50, 51, 52, 53, 18, 56.1, 5.11, 363/56.046, 46, 2, 132; 361/18, 111, 119, 361/56, 117, 42, 43, 44, 118, 120, 58
See application file for complete search history.

(56) References Cited

U.S. PATENT DOCUMENTS

| 5,388,021 | A | * | 2/1995 | Stahl .............................. 361/56 |
| 5,721,661 | A | * | 2/1998 | Mechanic ...................... 361/118 |
| 7,525,826 | B2 | * | 4/2009 | Iwamoto et al. ............. 363/56.1 |
| 7,933,108 | B2 | * | 4/2011 | Tallam .......................... 361/117 |
| 2004/0169982 | A1 | * | 9/2004 | Bunton et al. ................. 361/111 |
| 2006/0139832 | A1 | * | 6/2006 | Yates et al. .................... 361/111 |
| 2010/0061028 | A1 | * | 3/2010 | Lestician ....................... 361/111 |
| 2011/0164339 | A1 | * | 7/2011 | Schmid et al. ................. 361/18 |
| 2011/0193491 | A1 | * | 8/2011 | Choutov et al. ............... 315/291 |

* cited by examiner

*Primary Examiner* — Gary L Laxton
*Assistant Examiner* — Trinh Dang
(74) *Attorney, Agent, or Firm* — Charles E. Baxley

(57) ABSTRACT

A power supply having a power protection circuit has a rectification circuit and a converter. An input terminal of the rectification circuit is connected with the AC mains. A first voltage dependent resistor is connected with the AC mains. The converter has a transformer. A primary side of the transformer is connected with an output terminal of the rectification circuit, and the secondary side is connected to a power output terminal and a ground terminal. A Y capacitor is connected between the primary side of the transformer and the ground terminal. A surge protection module is connected between the first voltage dependent resistor and the Y capacitor. When a surge occurs between the primary and secondary sides of the transformer, a surge current is shunted by the surge protection module to the ground terminal through the Y capacitor without damaging internal components or circuits inside the power supply.

16 Claims, 3 Drawing Sheets

POWER SUPPLY HAVING A SURGE PROTECTION CIRCUIT

BACKGROUND OF THE INVENTION

1. Field of the Invention

The present invention relates to a power supply, and more particularly to a power supply having a surge protection circuit.

2. Description of the Related Art

Despite strict rules for ensuring safety and protection regarding power transmission and power supply in a modern society, there is no guarantee that power-receiving devices can be totally immune from damage throughout the course of power supply. The reason mostly lies in the intervention of natural power, such as lightning.

With reference to FIG. 4, a conventional power supply 90 has an AC power input terminal and a power output terminal connected with a ground terminal. The conventional power supply 90 serves to convert the mains power into an operating power for a load 992. The power supply 90 has a transformer 96, a voltage dependent resistor (VDR) 91, a common mode (CM) inductor 92, a rectification circuit 93, an input capacitor 94, a switch 95, an output capacitor 97 and a Y capacitor 98. The VDR 91, the common mode inductor 92, the rectification circuit 93, the input capacitor 94 and the switch 95 are parallelly connected with a primary side of the transformer 96. The output capacitor 97 is connected with the secondary side of the transformer 96, and both sides of the output capacitor 97 are connected to the power output terminal of the power supply 90 and the load 992. The Y capacitor 98 is connected between the primary side and the secondary side of the transformer 96 to cancel common mode electromagnetic interference (EMI). The AC power input terminal has a live line (L) and a neutral line (N). The VDR 91 is connected between the live line (L) and the neutral line (N) for the purpose of surge protection.

With reference to FIG. 5, the circuit is operated as follows. After the mains power enters from the AC power input terminal, the CM inductor 92 filters the CM noise of the mains power and the rectification circuit 93 converts the mains power into DC power. The switch 95 is connected to an output terminal of the rectification circuit 93. The DC power passing through the switch 95 is outputted to the primary side of the transformer 96 so that the secondary side of the transformer 96 can generate an induced voltage to be outputted to the power output terminal.

When lightning occurs, the energy of lightning generates a tremendously high voltage difference within a short period of time. According to the impedance characteristics of capacitors, a capacitor is considered in a state of short-circuit when subjected to such an abrupt and drastic voltage variation. Hence, when a surge voltage arising from lightning occurs between the primary side and the secondary side of the transformer 96, the Y capacitor is in a conducting state so that a surge current generated by the high voltage difference sequentially flows from the live line (L) to the ground terminal through the CM inductor 92, the rectification circuit 93, the input capacitor 94 and the Y capacitor 98. As a consequence, the CM inductor 92, the rectification circuit 93 and the input capacitor 94 are damaged by the surge current flowing through, and this causes the power supply 90 to fail.

SUMMARY OF THE INVENTION

An objective of the present invention is to provide a power supply having a surge protection circuit capable of preventing a surge from damaging components and circuits inside the power supply.

To achieve the foregoing objective, the power supply having a surge protection circuit has a rectification circuit, a first voltage dependent resistor, a converter, a power output terminal, a Y capacitor and a surge protection module.

The rectification circuit has an input terminal and an output terminal. The input terminal of the rectification circuit is adapted to connect with an AC power input terminal having a live line and a neutral line.

The first voltage dependent resistor is adapted to connect between the live line and the neutral line of the AC power input terminal.

The converter has a transformer having a primary side and a secondary side. The primary side is connected to the output terminal of the rectification circuit. The secondary side generates an induced voltage.

The power output terminal is connected with the secondary side of the transformer and a ground terminal.

The Y capacitor is connected between the primary side of the transformer and the power output terminal.

The surge protection module has a second voltage dependent resistor having two ends. One end of the second voltage dependent resistor is connected to the first voltage dependent resistor. The other end of the second voltage dependent resistor is connected to the Y capacitor.

When a surge occurs between the primary side and the secondary side of the transformer, the resulting high voltage is imposed on the surge protection module. The surge protection module clamps the high voltage and discharges the surge current to the ground terminal through the first voltage dependent resistor, the second voltage dependent resistor and the Y capacitor, thereby effectively preventing circuits or components inside the power supply from being damaged.

Other objectives, advantages and novel features of the invention will become more apparent from the following detailed description when taken in conjunction with the accompanying drawings.

DETAILED DESCRIPTION OF THE INVENTION

Figure 1:
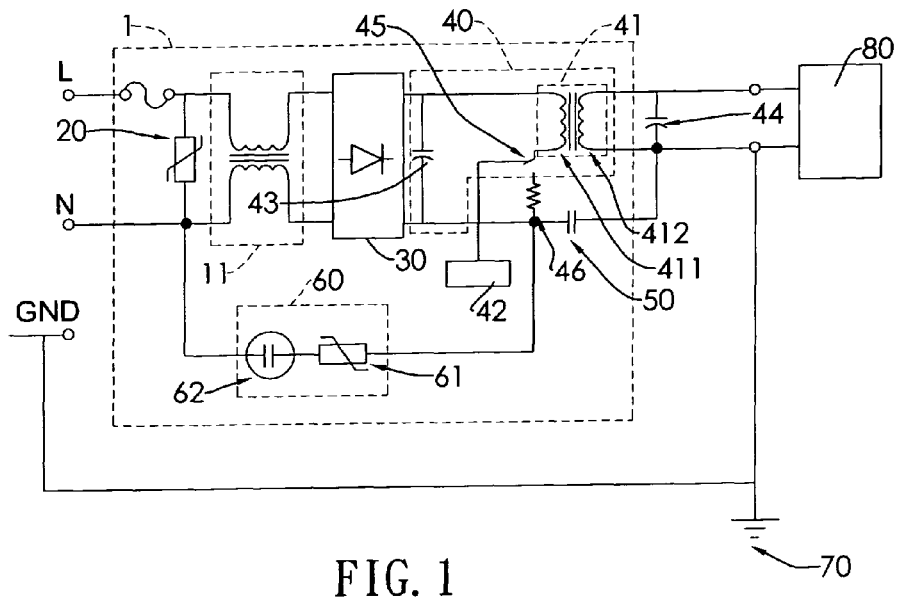
FIG. 1 is a circuit diagram of an embodiment of a power supply having a surge protection circuit in accordance with the present invention.

With reference to FIG. 1, a power supply having a surge protection circuit in accordance with the present invention has an AC power input terminal, a power output terminal, a first voltage dependent resistor (VDR) 20, a rectification circuit 30, a converter 40, a Y capacitor 50 and a surge protection module 60.

The AC power input terminal has a live line (L) and a neutral line (N).

The first VDR 20 is connected between the live line (L) and the neutral line (N) of the AC power input terminal.

The rectification circuit 30 serves to rectify the AC power sent from the AC power input terminal into DC power. In the present embodiment, the rectification circuit 30 may be a bridge rectifier.

The converter 40 has a transformer 41 and a controller (42). The transformer 41 has a primary side 411 and an inductively coupled secondary side 412. The primary side 411 is connected with an output terminal of the rectification circuit 30. The secondary side 412 generates an induced voltage. In the present embodiment, the primary side 411 and the secondary side 412 of the transformer 41 respectively have two ends. The converter 40 further has an input capacitor 43, an output capacitor 44 and a switch 45. The input capacitor 43 is connected between the two ends of the primary side 411 of the transformer 41. The output capacitor 44 is connected between the two ends of the secondary side 412 of the transformer 41. The switch 45 is connected with the primary side of the transformer 41 and the controller (42) and is driven by the controller (42).

The secondary side of the transformer 41 is connected with the power output terminal. The power output terminal is connected with a load 80 to supply power to the load 80. The power output terminal is further connected with a ground terminal 70.

The surge protection module 60 is connected between the first VDR 20 and the Y capacitor 50. In the present embodiment, the surge protection module 60 has a second VDR 61. The second VDR 61 has two ends. One end of the second VDR 61 is connected to the first VDR 20, and the other end is connected to the Y capacitor 50. The end of the second VDR 61 connected to the first VDR 20 is connected to the neutral line (N). The second VDR 61 may be connected with an end of the first VDR 20 connected with the live line (L).

In the present embodiment, the surge protection module 60 further has a gas tube 62. The gas tube 62 enhances EMI protection of the power supply 1, and is serially connected with the second VDR 61. The connection sequence of the second VDR 61 and the gas tube 62 can be interchanged. The gas tube 62 has two ends, one end of the gas tube 62 is connected with the first VDR 20, and the other end of the gas tube 62 is connected with the second VDR 61. Alternatively, the gas tube 62 may be located between the second VDR 61 and the Y capacitor 50. As a parasite capacitance of the gas tube 62 is less than 1 pF, the gas tube 62 can effectively block the EMI transmitted from the converter 40.

The gas tube 62 of the surge protection module 60 may be replaced by an inductor serially connected with the second VDR 61 so as to achieve a function similar to that of the gas tube 62.

The power supply 1 further has a CM inductor 11 connected between the AC power input terminal and the rectification circuit 30 to prevent common mode noises of AC power sent from the AC power input terminal from entering the rectification circuit 30.

Figure 2:
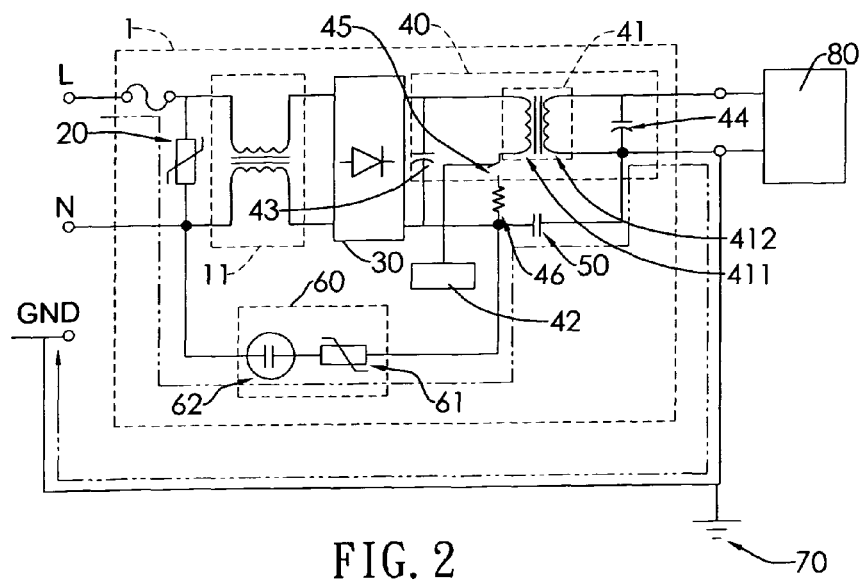
FIG. 2 is an operational circuit diagram of the power supply having a surge protection circuit in FIG. 1.

With reference to FIG. 2, when a surge arising from lightning occurs between the primary side 411 and the secondary side 412 of the transformer 41 of the converter 40 or large voltage difference is generated between the primary side 411 and the secondary side 412 of the transformer 41 due to the surge, the energy generated by the surge is imposed on the surge protection module 60. A surge current supposed to flow through the CM inductor 11, the rectification circuit 30 and the input capacitor 43 of the converter 40 is blocked by the first VDR 20 and the surge protection module 60 so that the first VDR 20 and the surge protection module 60 can provide a voltage clamping effect and a shunting path for the surge current. When the surge current flows to the surge protection module 60 through the first VDR 20, the second VDR is in a state of short-circuit upon the occurrence of lightning because the second VDR 61 has a parasite capacitance. The voltage difference generated by the surge is instantly and wholly applied to the gas tube 62. After the voltage difference exceeds a minimum breakdown voltage of the gas tube 62, the gas tube breaks down and enters a low impedance state. Thus, the voltage difference is fully dropped across the second VDR 61 and the surge current further flows to the ground terminal 70 through the Y capacitor 50 without damaging the CM inductor 11, the rectification circuit 30 and the input capacitor 43.

Figure 3:
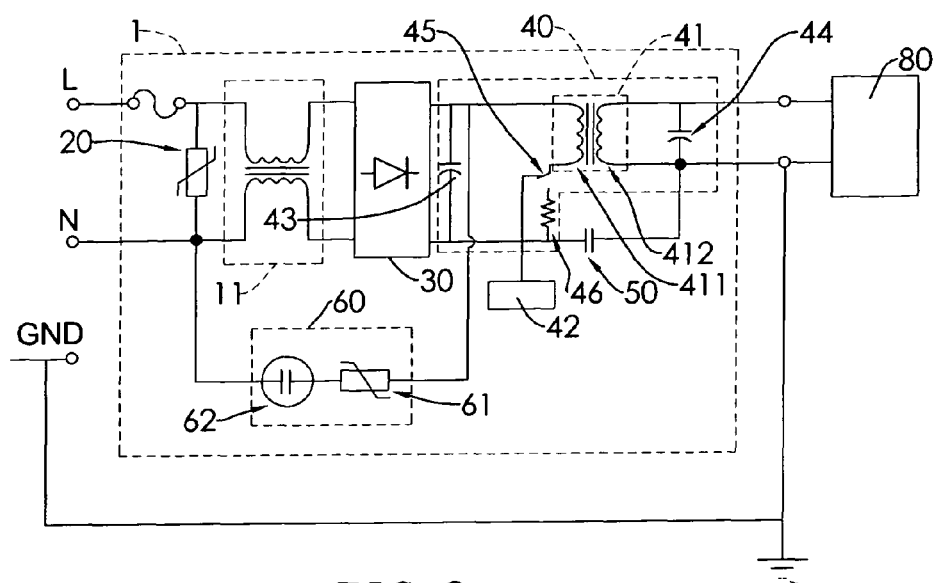
FIG. 3 is a circuit diagram of another embodiment of a power supply having a surge protection circuit in accordance with the present invention.
Figure 4:
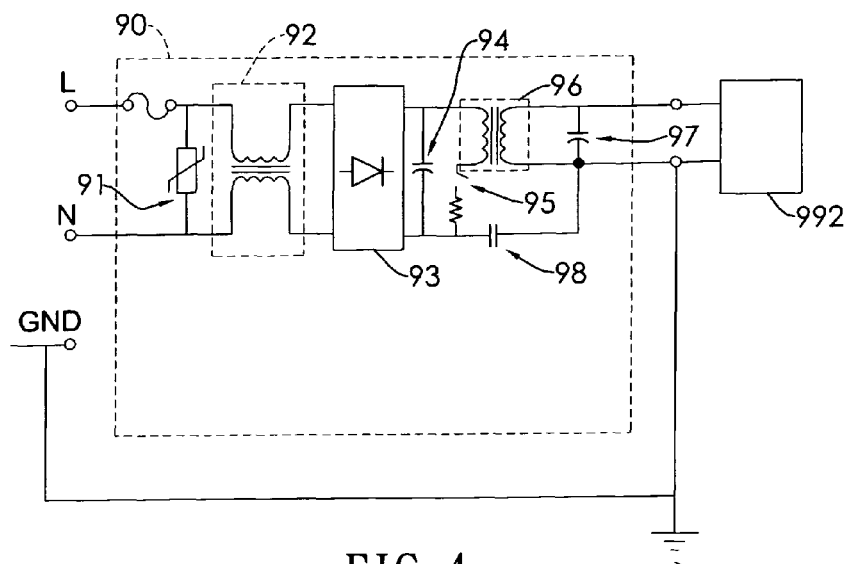
FIG. 4 is a circuit diagram of a conventional power supply.
Figure 5:
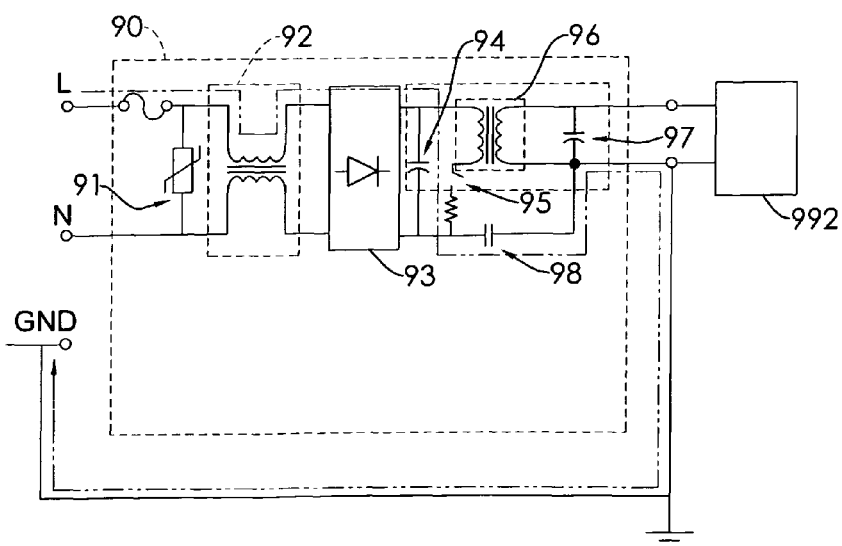
FIG. 5 is an operational circuit diagram of the conventional power supply in FIG. 4.

With reference to FIG. 3, another embodiment of a power supply having a power protection circuit in accordance with the present invention is shown. The surge protection module 60 is connected between the first VDR 20 and the output terminal of the rectification circuit 30. The present embodiment is applied when the input capacitor 43 is taken as a part of a shunting path to discharge the surge energy by the fact that the impedance of the input capacitor 43 becomes small during a sudden energy variation and is virtually in a state of short circuit. Therefore, when lightning happens, most energy of the surge can be discharged to the ground terminal through the surge protection module 60, the input capacitor 43 and the Y capacitor 50.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power supply having a surge protection circuit, comprising:
    a rectification circuit having:
        an input terminal connected with an AC power input; wherein the AC power input has a live line and a neutral line; and
        an output terminal adapted to connect to a load connected to the ground;
    a first voltage dependent resistor connected across the live line and the neutral line of the AC power input;
    a converter having:
        a transformer having:
            a primary side connected to the output terminal of the rectification circuit; and
            a secondary side generating an induced voltage;
    a power output terminal connected with the secondary side of the transformer and a ground terminal and adapted to connect to a load;
    a Y capacitor connected between the primary side of the transformer and the power output terminal; and
    a surge protection module having a second voltage dependent resistor having two ends, wherein one end of the second voltage dependent resistor is connected to the first voltage dependent resistor, and the Y capacitor is connected between the other end of the second voltage dependent resistor and the ground terminal;
    wherein when a surge occurs between the AC power input and the power output terminal, a surge voltage arising from the surge is clamped by the first voltage dependant resistor, and a surge current arising from the surge is shunted to sequentially flow through the surge protection module and the Y capacitor to the ground terminal with energy of the surge current absorbed by the surge protection module and the Y capacitor.

2. The power supply as claimed in claim 1, wherein the primary side and the secondary side of the transformer respectively have two ends; and the converter further has:

a controller;
    an input capacitor connected between the two ends of the primary side of the transformer;
    an output capacitor connected between the two ends of the secondary side of the transformer; and
    a switch connected with the primary side of the transformer and the controller and controlled by the controller.

3. The power supply as claimed in claim 1, wherein the surge protection module further has a gas tube serially connected with the second voltage dependent resistor.

4. The power supply as claimed in claim 1, wherein a common mode inductor is connected between the AC power input and the rectification circuit.

5. The power supply as claimed in claim 2, wherein the surge protection module is connected between the first voltage dependent resistor and the output terminal of the rectification circuit.

6. The power supply as claimed in claim 2, wherein the surge protection module further has a gas tube serially connected with the second voltage dependent resistor.

7. The power supply as claimed in claim 3, wherein the gas tube has two ends, one end of the gas tube is connected with the first voltage dependent resistor, and the other end of the gas tube is connected with the second voltage dependent resistor.

8. The power supply as claimed in claim 3, wherein a common mode inductor is connected between the AC power input and the rectification circuit.

9. The power supply as claimed in claim 3, wherein the gas tube has two ends, one end of the gas tube is connected with the second voltage dependent resistor, and the other end of the gas tube is connected with the Y capacitor.

10. The power supply as claimed in claim 5, wherein the surge protection module further has a gas tube serially connected with the second voltage dependent resistor.

11. The power supply as claimed in claim 6, wherein the gas tube has two ends, one end of the gas tube is connected with the first voltage dependent resistor, and the other end of the gas tube is connected with the second voltage dependent resistor.

12. The power supply as claimed in claim 6, wherein the gas tube has two ends, one end of the gas tube is connected with the second voltage dependent resistor, and the other end of the gas tube is connected with the Y capacitor.

13. The power supply as claimed in claim 6, wherein a common mode inductor is connected between the AC power input and the rectification circuit.

14. The power supply as claimed in claim 10, wherein the gas tube has two ends, one end of the gas tube is connected with the first voltage dependent resistor, and the other end of the gas tube is connected with the second voltage dependent resistor.

15. The power supply as claimed in claim 10, wherein the gas tube has two ends, one end of the gas tube is connected with the first voltage dependent resistor, and the other end of the gas tube is connected with the Y capacitor.

16. The power supply as claimed in claim 10, wherein a common mode inductor is connected between the AC power input and the rectification circuit.

\* \* \* \* \*